United States Patent
Chan et al.

(10) Patent No.: US 10,085,156 B2
(45) Date of Patent: *Sep. 25, 2018

(54) SELECTIVE ROBUST HEADER COMPRESSION (ROHC) FOR A VOIP CALL IN A CELLULAR COMMUNICATIONS NETWORK

(71) Applicant: Telefonaktiebolaget L M Ericsson (publ), Stockholm (SE)

(72) Inventors: Jayson Chan, Kanata (CA); Alexander Langereis, Sigtuna (SE); Eva Englund, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/290,789

(22) Filed: Oct. 11, 2016

(65) Prior Publication Data

US 2017/0034713 A1 Feb. 2, 2017

Related U.S. Application Data

(63) Continuation of application No. 13/675,308, filed on Nov. 13, 2012, now Pat. No. 9,467,894.

(51) Int. Cl.
*H04W 76/00* (2018.01)
*H04L 29/06* (2006.01)
(Continued)

(52) U.S. Cl.
CPC .......... *H04W 16/26* (2013.01); *H04B 17/336* (2015.01); *H04L 43/16* (2013.01);
(Continued)

(58) Field of Classification Search
None
See application file for complete search history.

(56) References Cited

U.S. PATENT DOCUMENTS 9,467,894 B2 * 10/2016 Chan .................. H04L 69/04
2006/0088000 A1 4/2006 Hannu et al.
(Continued)

FOREIGN PATENT DOCUMENTS

| WO | 2007059201 A2 | 5/2007 |
|---|---|---|
| WO | 2010002767 A1 | 1/2010 |
| WO | 2012108989 A1 | 8/2012 |

OTHER PUBLICATIONS

Author Unknown, "ETSI TS 136 321," European Telecommunications Standards Institute, Oct. 2012, Version 11.0.0, Release 11, 57 pages, France.

(Continued)

*Primary Examiner* — Ayaz Sheikh
*Assistant Examiner* — Sori Aga
(74) *Attorney, Agent, or Firm* — Withrow & Terranova, PLLC

(57) ABSTRACT

Systems and methods for selectively enabling Robust Header Compression (RoHC) for Voice over Internet Protocol (VoIP) calls in a cellular communications network are disclosed. In one embodiment, a data radio bearer for a VoIP call is established between a base station and a mobile terminal. During the VoIP call, a radio frequency parameter for the data radio bearer is monitored. When the radio frequency parameter for the data radio bearer satisfies a predefined coverage-based condition, the base station enables RoHC for the VoIP call. In one preferred embodiment, the radio frequency parameter is a Signal-to-Interference-plus-Noise Ratio (SINR) for the data radio bearer for the VoIP call, and the predefined coverage-based condition is a predefined SINR threshold below which the base station enables RoHC. By enabling RoHC in this manner, RoHC resources are selectively made available for those VoIP calls (Continued)

that will benefit most from increased cell coverage provided by RoHC.

16 Claims, 6 Drawing Sheets

(51) Int. Cl.
    *H04W 16/26* (2009.01)
    *H04W 28/06* (2009.01)
    *H04B 17/336* (2015.01)
    *H04L 12/26* (2006.01)
    *H04W 36/08* (2009.01)
    *H04M 7/00* (2006.01)
    *H04W 84/04* (2009.01)
    *H04W 88/02* (2009.01)
    *H04W 88/08* (2009.01)

(52) U.S. Cl.
    CPC ............ *H04L 65/00* (2013.01); *H04L 65/607* (2013.01); *H04L 69/04* (2013.01); *H04L 69/22* (2013.01); *H04W 28/06* (2013.01); *H04W 36/08* (2013.01); *H04W 76/00* (2013.01); *H04M 7/006* (2013.01); *H04W 84/042* (2013.01); *H04W 88/02* (2013.01); *H04W 88/08* (2013.01)

(56) References Cited

U.S. PATENT DOCUMENTS

2009/0022107 A1* 1/2009 Kapoor .................. H04L 69/04
                                                                     370/331
2010/0322151 A1   12/2010  Rácz et al.
2014/0064156 A1*  3/2014  Paladugu .......... H04W 28/0268
                                                                      370/259
2014/0133454 A1   5/2014  Chan et al.

OTHER PUBLICATIONS

Author Unknown, "ETSI TS 136 331," European Telecommunications Standards Institute, Nov. 2012, Version 11.1.0, Release 11, 329 pages, France.

Bormann, Carsten et al., "RObust Header Compression (ROHC): Framework and four profiles: RTP, UDP, ESP, and uncompressed," Internet-Draft, Network Working Group, Internet Engineering Task Force, Feb. 26, 2001, The Internet Society, 154 pages.

Rein, Stephan et al., "Voice Quality Evaluation in Wireless Packet Communication Systems: A Tutorial and Performance Results for ROHC," IEEE Wireless Communications, vol. 12, Issue 1, Feb. 2005, IEEE, pp. 60-67.

Non-Final Office Action for U.S. Appl. No. 13/675,308, dated Jun. 18, 2015, 5 pages.

Final Office Action for U.S. Appl. No. 13/675,308, dated Jan. 29, 2016, 7 pages.

Advisory Action for U.S. Appl. No. 13/675,308, dated May 19, 2016, 3 pages.

Notice of Allowance for U.S. Appl. No. 13/675,308, dated Jun. 13, 2016, 9 pages.

Examination Report for European Patent Application No. 13817977.5, dated Sep. 29, 2016, 7 pages.

International Search Report and Written Opinion for Application No. PCT/IB2013/059019, dated Jun. 2, 2014, 11 pages.

International Preliminary Report on Patentability for International Patent Application No. PCT/IB2013/059019, dated May 28, 2015, 8 pages.

\* cited by examiner

SELECTIVE ROBUST HEADER COMPRESSION (ROHC) FOR A VOIP CALL IN A CELLULAR COMMUNICATIONS NETWORK

RELATED APPLICATIONS

This application is a continuation of patent application Ser. No. 13/675,308, filed Nov. 13, 2012, now U.S. Pat. No. 9,467,894, the disclosure of which is hereby incorporated herein by reference in its entirety.

FIELD OF THE DISCLOSURE

The present disclosure relates generally to Voice over Internet Protocol (VoIP) calls in a cellular communications network and more particularly relates to Robust Header Compression (RoHC) for VoIP calls in a cellular communications network.

BACKGROUND

Voice over data networks has been seen as the next step in the evolution of wireless voice in cellular communications networks. The preferred protocol for enabling this evolution is Voice over Internet Protocol (VoIP). When using VoIP, each voice frame is routed using an Internet Protocol (IP) header. The IP header for VoIP is considerably larger than the very small header used for transporting voice traffic over the air in traditional 2G/3G cellular communications networks. This implies that the header overhead to payload ratio when using VoIP is much larger than that in traditional 2G/3G cellular communications networks, which is undesirable. One solution to this problem is the use of Robust Header Compression (RoHC) to compress the IP header before the IP header is transmitted over the air.

One key benefit of RoHC when used with VoIP in Long Term Evolution (LTE) cellular communications networks is improved cell coverage for VoIP users. In particular, RoHC decreases the number of bits needed per VoIP packet, thus decreasing the risk that VoIP packet segmentation will occur. This translates into a path-loss improvement, which in turn increases the cell coverage for the VoIP user.

RoHC is a resource intensive application. In other words, RoHC requires a significant amount of resources (i.e., processing cycles and memory) at a base station in a cellular communications network. One issue that arises when using RoHC with VoIP is that the base station may not have sufficient resources to enable RoHC for all VoIP calls. As such, there is a need for systems and methods that selectively enable RoHC for VoIP calls in a cellular communications network.

SUMMARY

The present disclosure relates to systems and methods for selectively enabling Robust Header Compression (RoHC) for Voice over Internet Protocol (VoIP) calls in a cellular communications network. In one embodiment, a data radio bearer for a VoIP call is established between a base station and a mobile terminal. During the VoIP call, a radio frequency parameter for the data radio bearer is monitored. When the radio frequency parameter for the data radio bearer satisfies a predefined coverage-based condition, the base station enables RoHC for the VoIP call. In one preferred embodiment, the radio frequency parameter is a Signal-to-Interference-plus-Noise Ratio (SINR) for the data radio bearer for the VoIP call, and the predefined coverage-based condition is a predefined SINR threshold below which the base station enables RoHC. Still further, in one particular embodiment, the predefined SINR threshold is a predefined SINR threshold below which the base station enables Transmit Time Interval (TTI) bundling. By enabling RoHC in this manner, RoHC resources are selectively made available for those VoIP calls that will benefit most from increased cell coverage provided by RoHC.

In one embodiment, a base station has a finite amount of RoHC resources (i.e., processor cycles and memory resources) that are available for RoHC. The RoHC resources are logically divided into a first-come, first-serve RoHC resource pool and a selective RoHC resource pool. A data radio bearer for a VoIP call is established between the base station and a mobile terminal. During the VoIP call, a radio frequency parameter for the data radio bearer is monitored. When the radio frequency parameter for the data radio bearer satisfies a predefined coverage-based condition, the base station performs a selective RoHC admission process. In one preferred embodiment, the radio frequency parameter is a SINR for the data radio bearer for the VoIP call, and the predefined coverage-based condition is a predefined SINR threshold below which the base station enables RoHC. Still further, in one particular embodiment, the predefined SINR threshold is a predefined SINR threshold below which the base station enables TTI bundling. As a result of the selective RoHC admission process, the base station enables RoHC for the VoIP call if there are available RoHC resources in either the first-come, first-serve RoHC resource pool or the selective RoHC resource pool. Conversely, if there are no available RoHC resources in the first-come, first-serve RoHC resource pool and the selective RoHC resource pool, the base station does not enable RoHC for the VoIP call.

In another embodiment, a data radio bearer for a VoIP call is established between the base station and a mobile terminal. During the VoIP call, a SINR for the data radio bearer is monitored. When the SINR for the data radio bearer falls below a predefined threshold for triggering TTI bundling, the base station performs an intra-cell handover procedure to establish a new data radio bearer for the VoIP call in which both TTI bundling and RoHC are enabled.

In yet another embodiment, a base station has a finite amount of RoHC resources (i.e., processor cycles and memory resources) that are available for RoHC. The RoHC resources are logically divided into a first-come, first-serve RoHC resource pool and a selective RoHC resource pool. A data radio bearer for a VoIP call is established between the base station and a mobile terminal. During the VoIP call, a SINR for the data radio bearer is monitored. When the SINR for the data radio bearer falls below a predefined threshold for triggering TTI bundling, the base station performs a selective RoHC admission process. As a result of the selective RoHC admission process, the base station determines that RoHC is to be enabled for the VoIP call if there are available RoHC resources in either the first-come, first-serve RoHC resource pool or the selective RoHC resource pool. Conversely, if there are no available RoHC resources in the first-come, first-serve RoHC resource pool and the selective RoHC resource pool, the base station determines that RoHC is not to be enabled for the VoIP call. The base station then performs an intra-cell handover procedure to establish a new data radio bearer for the VoIP call in which TTI bundling is enabled and RoHC is enabled or disabled according to the result of the selective RoHC admission process.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 3A:
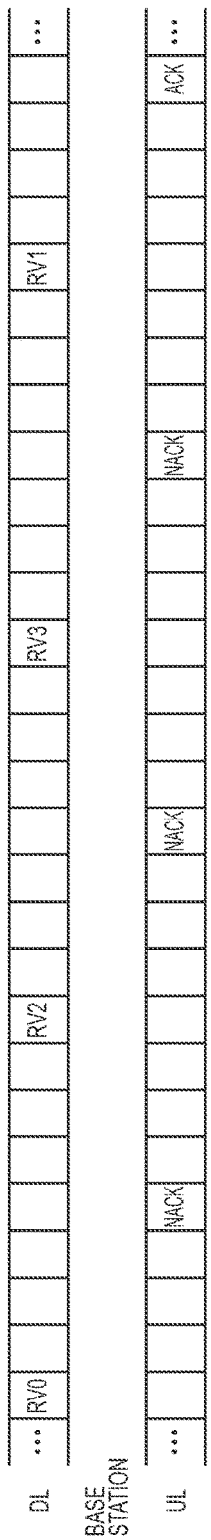
Figure 3B:
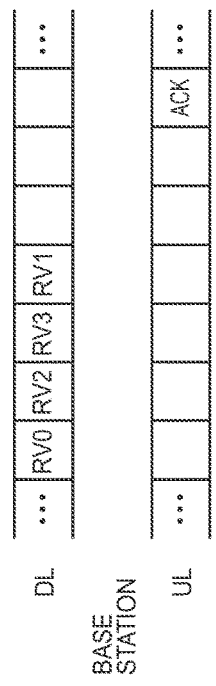
Figure 4:
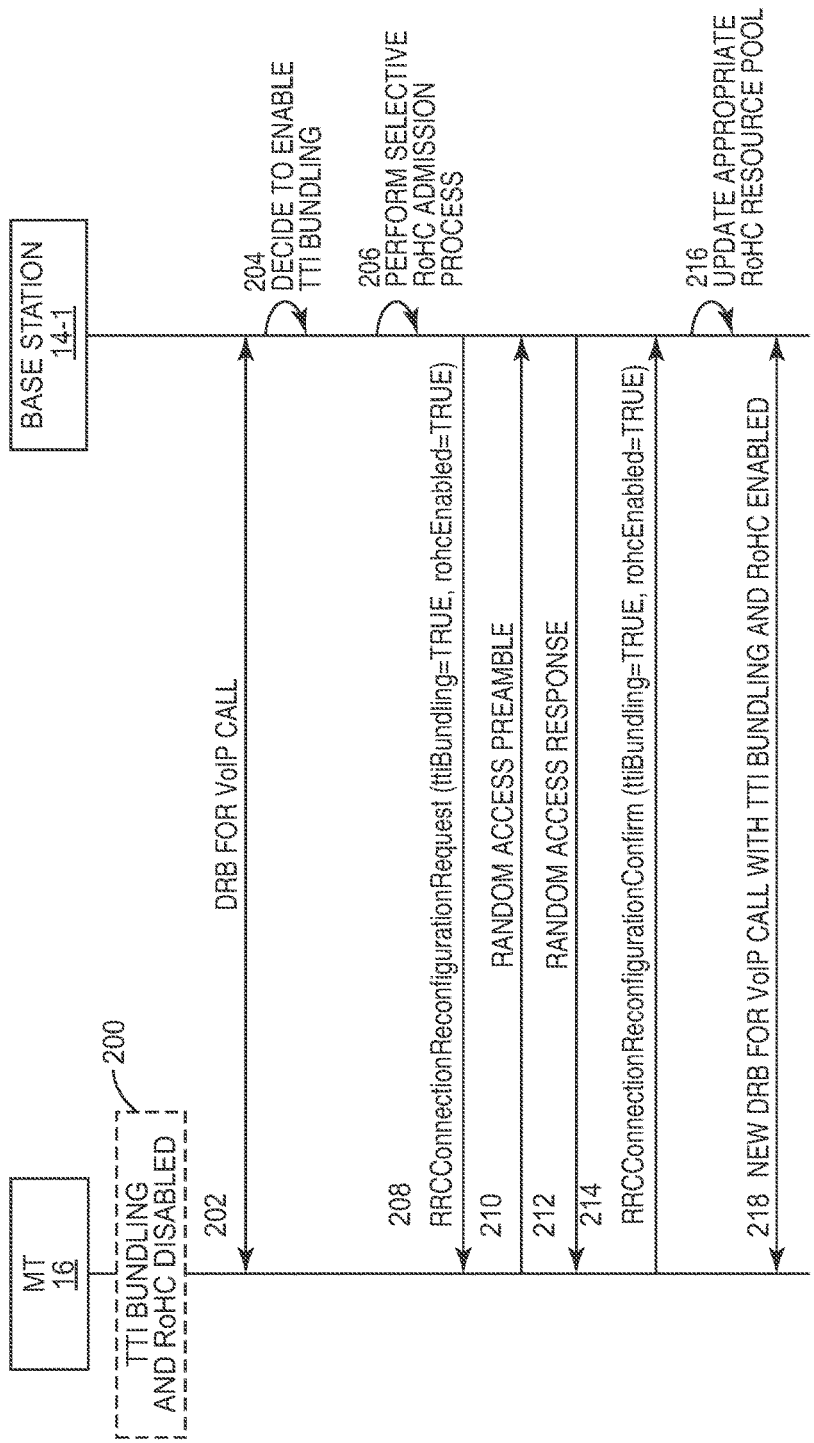
Figure 5:
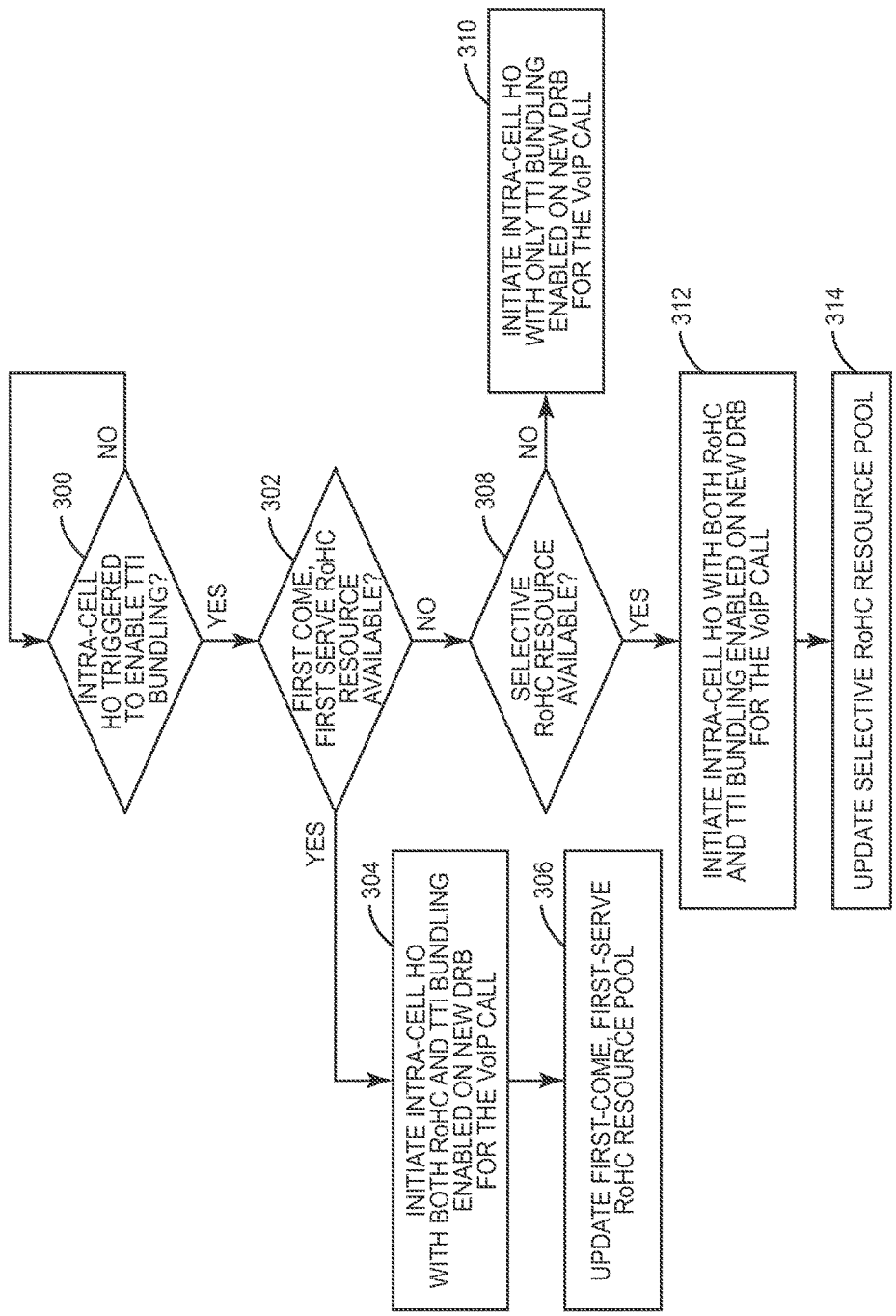
Figure 7:
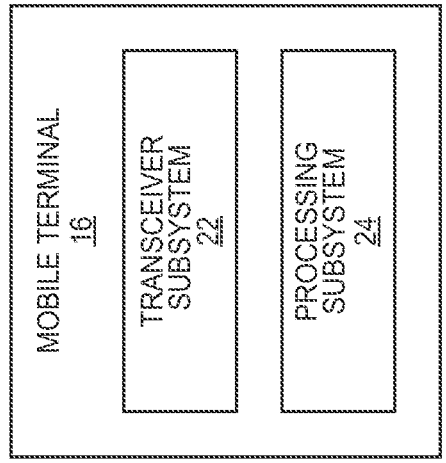
Figure 6:
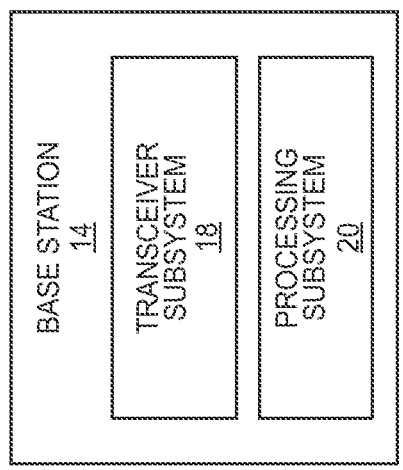

FIGS. 3A and 3B graphically illustrate a Hybrid Automatic Repeat Request (HARQ) transmission scheme without and with Transmit Time Interval (TTI) bundling;

FIG. 4 illustrates the operation of a base station to perform an intra-cell handover to enable both TTI bundling and RoHC for a VoIP call according to one embodiment of the present disclosure;

FIG. 5 is a flow chart that illustrates the operation of a base station to selectively enable RoHC for a VoIP call according to another embodiment of the present disclosure;

FIG. 6 is a block diagram of a base station according to one embodiment of the present disclosure; and FIG. 7 is a block diagram of a mobile terminal according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to systems and methods for selective Robust Header Compression (RoHC) for Voice over Internet Protocol (VoIP) calls in a cellular communications network. Notably, much of the discussion herein focuses on selective RoHC for VoIP calls in a Long Term Evolution (LTE) cellular communications network. As such, LTE terminology is oftentimes used throughout this disclosure. However, the concepts disclosed herein are not limited to LTE cellular communications networks. Rather, the concepts disclosed herein may be used to provide selective RoHC for VoIP calls in other types of cellular communications networks.

Figure 1:
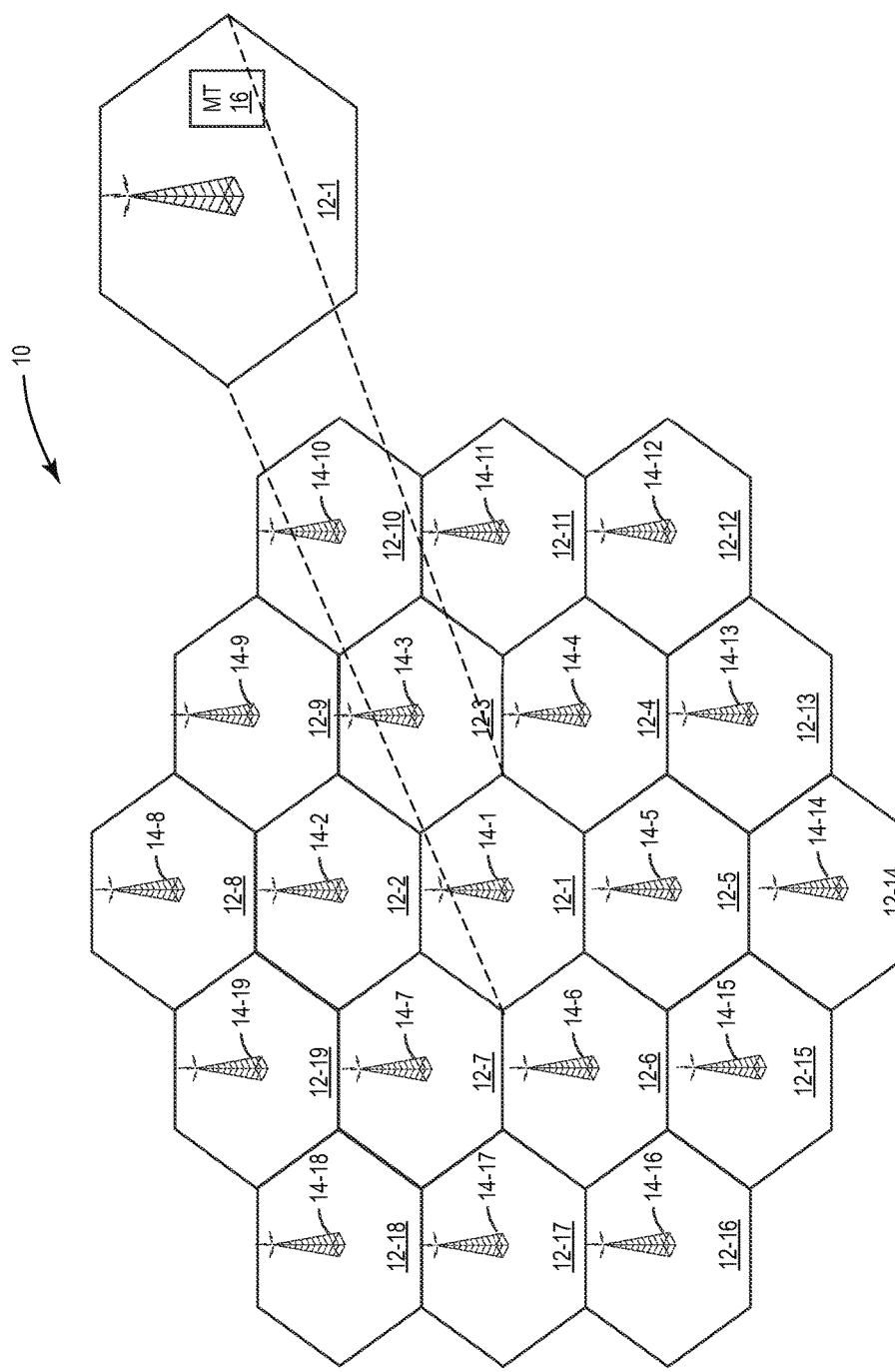
FIG. 1 illustrates a cellular communications network providing selective Robust Header Compression (RoHC) for Voice over Internet Protocol (VoIP) calls according to one embodiment of the present disclosure.

FIG. 1 illustrates a cellular communications network 10 that provides selective RoHC for VoIP calls according to one embodiment of the present disclosure. In this embodiment, the cellular communications network 10 is a LTE cellular communications network. However, as discussed above, the present disclosure is not limited thereto. The cellular communications network 10 includes a number of cells 12-1 through 12-19, which are generally referred to herein collectively as cells 12 and individually as cell 12. Notably, while nineteen cells 12 are illustrated in FIG. 1 for clarity and ease of discussion, it will be readily appreciated by one of ordinary skill in the art that the cellular communications network 10 may include any number of cells 12 and, in most implementations, will include a relatively large number of cells 12.

In this embodiment, the cells 12-1 through 12-19 are served by corresponding base stations 14-1 through 14-19, which are generally referred to herein collectively as base stations 14 and individually as base station 14. For LTE, the base stations 14 are typically enhanced Node Bs (eNBs) but may also include low power base stations (e.g., home eNBs or femto base stations). Further, while in this embodiment each of the base stations 14 serves only one cell 12, one or more of the base stations 14 may alternatively serve multiple cells 12. For instance, in LTE, an eNB may serve multiple cells, or sectors. The base stations 14 provide cellular communications services (e.g., voice and data services) to mobile terminals (MTs), such as a mobile terminal 16 located in the cell 12-1. While only one mobile terminal 16 is illustrated in FIG. 1, it will be readily appreciated by one of ordinary skill in the art that the cellular communications network 10 will typically serve hundreds, thousands, or even millions of mobile terminals 16.

As discussed below in detail, the base stations 14, or at least some of the base stations 14, provide selective RoHC for VoIP calls. In general, each of the base stations 14 has a finite amount of resources (i.e., processing cycles and memory resources) that can be used for RoHC, where these resources are referred to herein as RoHC resources. The RoHC resources of each base station 14 are logically divided into a first-come, first-serve RoHC resource pool and a selective RoHC resource pool. The first-come, first serve RoHC resource pool includes an amount of RoHC resources that is sufficient to provide RoHC for a number ($N_{FCFS}$) of VoIP calls, and the selective RoHC resource pool includes an amount of RoHC resources that is sufficient to provide RoHC for a number ($N_{SELECTIVE}$) of VoIP calls. Note that $N_{FCFS}$ and $N_{SELECTIVE}$ may vary among the base stations 14 depending on the finite amount of RoHC resources of each of the base stations 14. In one embodiment, $N_{SELECTIVE}$ is in a range of 10% to 15% of the finite amount of RoHC resources of the base station 14, whereas $N_{FCFS}$ is the remainder of the finite amount of RoHC resources of the base station 14. Thus, in other words, $N_{SELECTIVE}$ is in a range of 10% to 15% of a total number of VoIP calls for which the finite amount of RoHC resources can provide RoHC, whereas $N_{FCFS}$ is the remainder.

The base stations 14 provide selective RoHC for VoIP calls based on a coverage-based condition. More specifically, the base stations 14 provide selective RoHC for VoIP calls such that the selective RoHC resources of the base stations 14 are only available for VoIP calls for which the coverage-based condition is satisfied. In one preferred embodiment, the coverage-based condition is a Signal to Interference plus Noise Ratio (SINR) that is less than a predefined threshold. Still further, in one particular embodiment, the coverage-based condition is the same condition used to trigger Transmit Time Interval (TTI) bundling. By reserving the selective RoHC resources for VoIP calls that satisfy the coverage-based condition, the base stations 14 ensure that RoHC resources are available for VoIP calls that would most benefit from the cell coverage improvement provided by RoHC.

Figure 2:
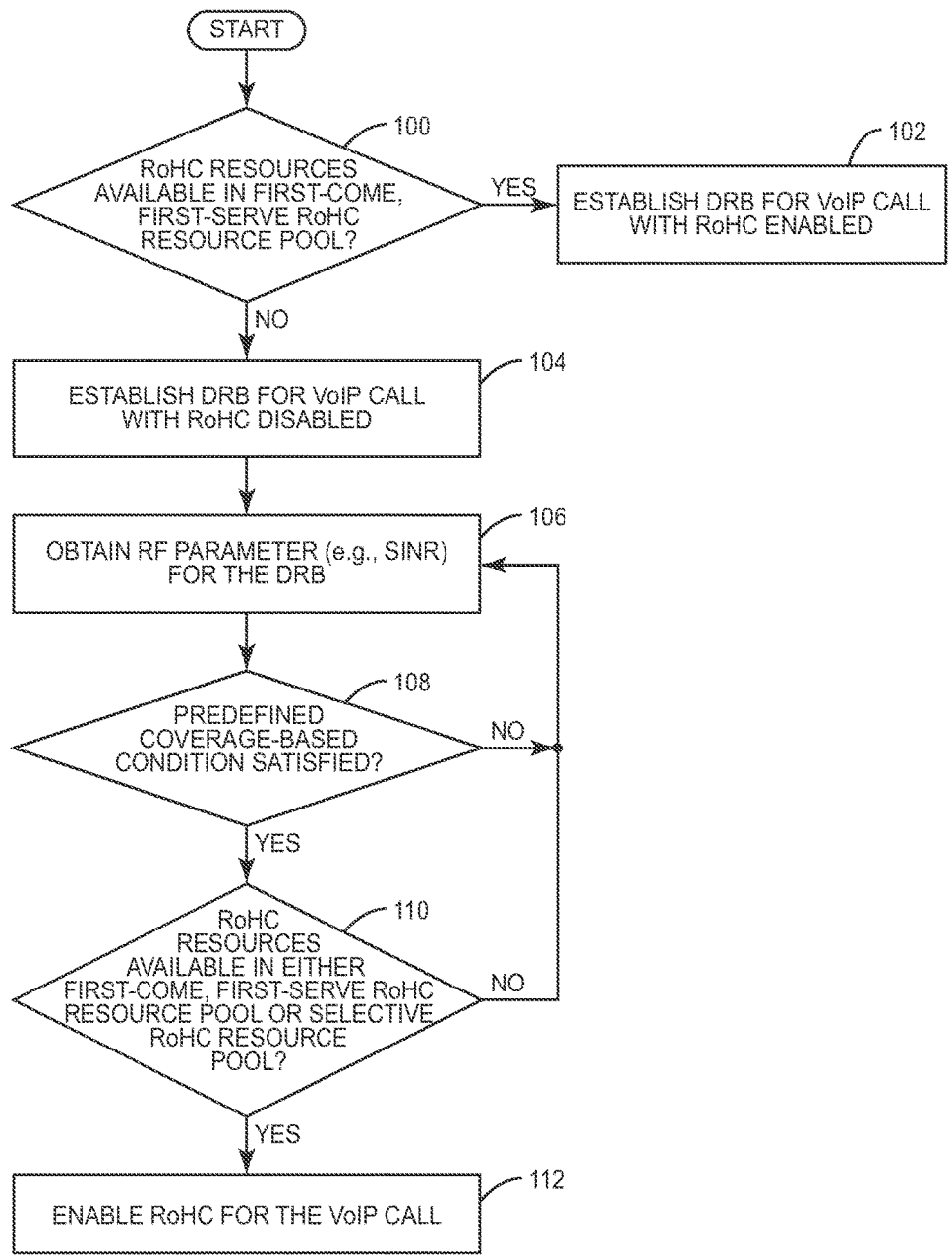
FIG. 2 is a flow chart that illustrates the operation of a base station to selectively enable RoHC for a VoIP call according to one embodiment of the present disclosure.

FIG. 2 is a flow chart that illustrates the operation of one of the base stations 14 of FIG. 1 to provide selective RoHC for a VoIP call according to one embodiment of the present disclosure. For this discussion, the base station 14 is the base station 14-1, and the VoIP call is a VoIP call either to or from the mobile terminal 16 located in the cell 12-1 of the base station 14-1. The process begins when a Data Radio Bearer (DRB) for a VoIP call either to or from the mobile terminal 16 is to be established. This may be when a VoIP call to or from the mobile terminal 16 is initially set up or when there is an inter-cell handover of the VoIP call to the base station 14-1.

When a DRB for the VoIP call is to be established, the base station 14-1 determines whether RoHC resources are available in the first-come, first-serve RoHC resource pool of the base station 14-1 (step 100). If so, the base station 14-1 establishes a DRB for the VoIP call with RoHC enabled (step 102). Preferably, RoHC is enabled in both the uplink and downlink directions. If there are no available RoHC resources in the first-come, first serve RoHC resource pool of the base station 14-1, the base station 14-1 establishes a DRB for the VoIP call with RoHC disabled (step 104). Note that, after establishing the DRB with RoHC disabled, the base station 14-1 may optionally monitor the first-come, first-serve RoHC resource pool of the base station 14-1 to determine if RoHC resources subsequently become available and, if so, enable RoHC for the VoIP call.

After establishing the DRB for the VoIP call with RoHC disabled in step 104, the base station 14-1 monitors a Radio Frequency (RF) parameter for the DRB to determine when a predefined coverage-based condition is satisfied. More specifically, the base station 14-1 obtains the RF parameter for the DRB (step 106). The base station 14-1 then determines whether the RF parameter satisfies the predefined coverage-based condition (step 108). In one preferred embodiment, the RF parameter is a SINR for the DRB, and the predefined coverage-based condition is a condition where the SINR is less than a predefined threshold. Further, in one preferred embodiment, the predefined coverage-based condition is the same condition used to trigger TTI bundling (e.g., the same SINR threshold used to trigger TTI bundling).

If the predefined coverage-based condition is not satisfied, the process returns to step 106 and is repeated. Conversely, if the predefined coverage-based condition is satisfied, the base station 14-1 then determines whether there are available RoHC resources in either the first-come, first-serve RoHC resource pool or the selective RoHC resource pool of the base station 14-1 (step 110). If not, the process returns to step 106 and is repeated such that RoHC may thereafter be enabled if the predefined coverage-based condition is satisfied and RoHC resources become available. If RoHC resources are available in either the first-come, first-serve RoHC resource pool or the selective RoHC resource pool of the base station 14-1, the base station 14-1 enables RoHC for the VoIP call (step 112). As discussed below, in one particular embodiment, the base station 14-1 enables RoHC for the VoIP call by performing an intra-cell handover to a new DRB that has RoHC enabled. Using the process of FIG. 2, the base station 14-1 reserves the selective RoHC resource pool for those VoIP calls that would benefit most by the cell coverage improvement provided by RoHC. Thus, the selective RoHC resource pool prevents starvation of RoHC resources for those VoIP calls that would most benefit from RoHC, while the first-come, first-serve RoHC resource pool allows RoHC for all VoIP calls as long as there are sufficient RoHC resources in the base station 14-1.

As mentioned above, in one preferred embodiment, the RF parameter and the predefined coverage-based condition are the same as those used to trigger TTI bundling. As such, before proceeding, a brief overview of Hybrid Automatic Repeat Request (HARQ) and TTI bundling is beneficial. In LTE as well as most other modern cellular communications standards, a HARQ transmission scheme is utilized. HARQ utilizes both forward error-correction coding and Automatic Repeat Request (ARQ) to enable successful reception and decoding of transmissions under varying channel conditions. When using HARQ, the mobile terminal 16 requests retransmission for erroneously received packets as illustrated in FIG. 3A. TTI bundling is triggered under poor radio conditions in order to reduce overhead. Notably, TTI bundling is also referred to as subframe bundling. Also, when TTI bundling is not enabled, HARQ operation is referred to as normal HARQ operation. Typically, TTI bundling is triggered, or enabled, when the SINR falls below a predefined threshold. Currently, for LTE, the HARQ transmissions are in the sequence Redundancy Version (RV) 0, RV2, RV3, RV1. As illustrated in FIG. 3B, when using TTI bundling, the TTIs for the initial HARQ transmission and one or more subsequent HARQ retransmissions are grouped, or bundled, into successive TTIs. In this manner, the base stations 14 are enabled to successfully receive and decode the transmission with reduced overhead (i.e., without the mobile terminal 16 transmitting multiple NACKs) and with less latency.

FIG. 4 illustrates the operation of one of the base stations 14 to perform selective RoHC based on the same coverage-based condition used to trigger TTI bundling according to one embodiment of the present disclosure. For this discussion, the base station 14 is the base station 14-1. In this example, initially, both TTI bundling and RoHC are disabled for a VoIP call either to or from the mobile terminal 16 (step 200). As such, VoIP transmissions are transmitted over a DRB having both TTI bundling and RoHC disabled (step 202). At some point during the VoIP call, the base station 14-1 makes a decision to enable TTI bundling for the VoIP call (step 204). More specifically, the base station 14-1 monitors an RF parameter for the VoIP call. When the RF parameter satisfies a predefined condition for triggering TTI bundling, the base station 14-1 makes the decision to enable TTI bundling. In one preferred embodiment, the RF parameter is SINR, and the predefined condition for triggering TTI bundling is a condition that the SINR falls below a predefined threshold.

In response to the decision to enable TTI bundling, the base station 14-1 performs a selective RoHC admission process in order to decide whether RoHC resources are available (step 206). In general, the base station 14-1 determines whether RoHC resources are available in either the first-come, first-serve RoHC resource pool or the selective RoHC resource pool of the base station 14-1. In this example, the base station 14-1 determines that RoHC resources are available. As such, the base station 14-1 initiates an intra-cell handover to enable both TTI bundling and RoHC. Notably, in this embodiment, the decision on whether to selectively enable RoHC for the VoIP call is piggy-backed on the decision to enable TTI bundling.

For LTE, in order to perform the intra-cell handover, the base station 14-1 first sends an RRCConnectionReconfigurationRequest message to the mobile terminal 16 in order to request a new DRB for the VoIP call having both TTI bundling and RoHC enabled (step 208). From this point, the conventional LTE intra-cell handover procedure is performed. Specifically, the mobile terminal 16 sends a random access preamble to the base station 14-1 (step 210). In response, the base station 14-1 then returns a random access response to the mobile terminal 16 (step 212). At that point, the mobile terminal 16 sends an RRCConnectionReconfigurationConfirm message to the base station 14-1 confirming that both TTI bundling and RoHC are enabled for the new DRB for the VoIP call (step 214). At this point, the intra-cell handover is complete. Using the intra-cell handover, the base station 14-1 simultaneously enables both TTI bundling and RoHC for the VoIP call. Notably, in LTE, TTI bundling is only enabled in the uplink. However, RoHC is preferably enabled for the DRB in both the uplink and downlink directions.

Once the intra-cell handover is complete, the base station 14-1 updates the appropriate RoHC resource pool to indicate that the RoHC resources used for the new DRB are no longer available (step 216). Note that while in FIG. 4 the appropriate RoHC resource pool is updated after the intra-cell handover has been completed, the base station 14-1 may alternatively update the appropriate RoHC resource pool at any time between the decision made in step 206 and the completion of the intra-cell handover. For example, the base station 14-1 may update the appropriate RoHC resource pool after making the decision in step 206 and before sending the RRCConnectionReconfigurationRequest in step 208 in order to reserve RoHC resources for the new DRB. In this case, if the intra-cell handover fails, the base station 14-1 updates the appropriate RoHC resource pool to release the RoHC resources that were reserved for the new DRB. Lastly, VoIP transmissions for the VoIP call are transmitted over the new DRB having both TTI bundling and RoHC enabled (step 218).

FIG. 5 is a flow chart that illustrates the operation of the base station 14-1 of FIG. 4 to perform a selective RoHC admission process and, if RoHC is enabled, update the appropriate RoHC resource pool according to one embodiment of the present disclosure. Thus, in general, FIG. 5 illustrates steps 206 and 216 of FIG. 4 in more detail according to one embodiment of the present disclosure. Again, for this discussion, the base station 14 is the base station 14-1. However, this discussion is equally applicable to the other base stations 14. First, the base station 14-1 determines whether an intra-cell handover has been triggered to enable TTI bundling (step 300). More specifically, as discussed above, the base station 14-1 determines whether the RF parameter for the DRB for the VoIP call satisfies the predefined condition for triggering TTI bundling. Again, in one preferred embodiment, the RF parameter is SINR, and the predefined condition for triggering TTI bundling is the condition that the SINR falls below a predefined threshold for triggering TTI bundling.

If an intra-cell handover has not been triggered to enable TTI bundling, the process returns to step 300 and waits until an intra-cell handover has been triggered to enable TTI bundling. Once an intra-cell handover has been triggered to enable TTI bundling, the base station 14-1 determines whether RoHC resources are available in the first-come, first-serve RoHC resource pool of the base station 14-1 (step 302). If so, the base station 14-1 initiates an intra-cell handover of the VoIP call to a new DRB with both TTI bundling and RoHC enabled (step 304). The base station 14-1 then updates the first-come, first-serve RoHC resource pool to reflect that the RoHC resources used for the new DRB are no longer available (step 306). For example, the base station 14-1 may maintain a counter that is equal the number of VoIP calls that are utilizing RoHC resources from the first-come, first-serve RoHC resource pool. So, if all of the RoHC resources in the first-come, first-serve RoHC resource pool are available, then the counter would be equal to 0. Conversely, if none of the RoHC resources in the first-come, first-serve RoHC resource pool are available, then the counter would be equal to $N_{FCFS}$. Thus, in this example, the base station 14-1 updates the first-come, first-serve RoHC resource pool by increasing the counter by 1. When the RoHC resources are subsequently released, the counter is decreased by 1.

Returning to step 302, if there are no available RoHC resources in the first-come, first-serve RoHC resource pool, the base station 14-1 determines whether there are available RoHC resources in the selective RoHC resource pool (step 308). If not, the base station 14-1 initiates an intra-cell handover of the VoIP call to a new DRB with TTI bundling enabled and RoHC disabled (step 310). Notably, if step 310 is triggered often, allocation of the RoHC resources of the base station 14-1 to the first-come, first-serve RoHC resource pool and the selective RoHC resource pool may be rebalanced in order to allocate more RoHC resources to the selective RoHC resource pool. This re-balancing may be performed programmatically by the base station 14-1 in response to the base station 14-1 detecting that step 310 is performed often (e.g., for at least a predefined threshold number or percentage of intra-cell handovers triggered to enable TTI bundling). Alternatively, the re-balancing may be performed manually by an operator of the base station 14-1.

Returning to step 308, if RoHC resources are available in the selective RoHC resource pool, the base station 14-1 initiates an intra-cell handover of the VoIP call to a new DRB with both TTI bundling and RoHC enabled (step 312). The base station 14-1 then updates the selective RoHC resource pool to reflect that the RoHC resources used for the new DRB are no longer available (step 314). For example, the base station 14-1 may maintain a counter that is equal the number of VoIP calls that are utilizing RoHC resources from the selective RoHC resource pool. So, if all of the RoHC resources in the selective RoHC resource pool are available, then the counter would be equal to 0. Conversely, if none of the RoHC resources in the selective RoHC resource pool are available, then the counter would be equal to $N_{SELECTIVE}$. Thus, in this example, the base station 14-1 updates the selective RoHC resource pool by increasing the counter by 1. When the RoHC resources are subsequently released, the counter is decreased by 1.

FIG. 6 is a block diagram of one of the base stations 14 of FIG. 1 according to one embodiment of the present disclosure. The base station 14 includes a transceiver subsystem 18 and a processing subsystem 20. The transceiver subsystem 18 generally includes analog and, in some embodiments, digital components for wirelessly sending and receiving messages to and from the mobile terminals 16 in the cellular communications network 10. In particular embodiments, the transceiver subsystem 18 may represent or include a radio-frequency (RF) transceiver, or a separate RF transmitter and receiver, capable of transmitting messages and/or other suitable information wirelessly to the mobile terminal 16.

The processing subsystem 20 is implemented in hardware or a combination of hardware and software. Among other things, the processing subsystem 20 performs selective RoHC as described herein. In particular embodiments, the processing subsystem 20 may comprise, for example, one or several general-purpose or special-purpose microprocessors or other microcontrollers programmed with suitable software and/or firmware to carry out some or all of the functionality of the base station 14 described herein. In addition or alternatively, the processing subsystem 20 may comprise various digital hardware blocks (e.g., one or more Application Specific Integrated Circuits (ASICs), one or more off-the-shelf digital and analog hardware components, or a combination thereof) configured to carry out some or all of the functionality of the base station 14 described herein. Additionally, in particular embodiments, the above described functionality of base station 14 may be implemented, in whole or in part, by the processing subsystem 20 executing software or other instructions stored on a non-transitory computer-readable medium, such as random access memory (RAM), read only memory (ROM), a magnetic storage device, an optical storage device, or any other suitable type of data storage components.

FIG. 7 is a block diagram of the mobile terminal 16 of FIG. 1 according to one embodiment of the present disclosure. The mobile terminal 16 includes a transceiver subsystem 22 and a processing subsystem 24. The transceiver subsystem 22 generally includes analog and, in some embodiments, digital components for wirelessly sending and receiving messages to and from the base stations 14 in the cellular communications network 10. In particular embodiments, the transceiver subsystem 22 may represent or include an RF transceiver, or a separate RF transmitter and receiver, capable of transmitting messages and/or other suitable information wirelessly to the base stations 14.

The processing subsystem 24 is implemented in hardware or a combination of hardware and software. In general, the processing subsystem 24 enables the mobile terminal 16 to perform the functions of the mobile terminal 16 described herein. In particular embodiments, the processing subsystem 24 may comprise, for example, one or several general-purpose or special-purpose microprocessors or other microcontrollers programmed with suitable software and/or firmware to carry out some or all of the functionality of the mobile terminal 16 described herein. In addition or alternatively, the processing subsystem 24 may comprise various digital hardware blocks (e.g., one or more ASICs, one or more off-the-shelf digital and analog hardware components, or a combination thereof) configured to carry out some or all of the functionality of the mobile terminal 16 described herein. Additionally, in particular embodiments, the above described functionality of the mobile terminal 16 may be implemented, in whole or in part, by the processing subsystem 24 executing software or other instructions stored on a non-transitory computer-readable medium, such as RAM, ROM, a magnetic storage device, an optical storage device, or any other suitable type of data storage components.

The following acronyms are used throughout this disclosure.

ARQ Automatic Repeat Request
ASIC Application Specific Integrated Circuit
DRB Data Radio Bearer
eNB Enhanced Node B
HARQ Hybrid Automatic Repeat Request
HO Handover
IP Internet Protocol
LTE Long Term Evolution
MT Mobile Terminal
RAM Random Access Memory
RF Radio Frequency
RoHC Robust Header Compression
ROM Read Only Memory
RV Redundancy Version
SINR Signal to Interference plus Noise Ratio
TTI Transmit Time Interval
VoIP Voice over Internet Protocol Those skilled in the art will recognize improvements and modifications to the preferred embodiments of the present disclosure. All such improvements and modifications are considered within the scope of the concepts disclosed herein and the claims that follow.

What is claimed is:

1. A method of operation of a base station in a cellular communications network, comprising:
establishing a data radio bearer between the base station and a mobile terminal for a Voice-Over Internet Protocol (VoIP) call;
determining that a radio frequency parameter for the data radio bearer satisfies a predefined coverage-based condition;
determining that the base station has available Robust Header Compression (RoHC) resources;
in response to determining that the radio frequency parameter for the data radio bearer satisfies the predefined coverage-based condition, enabling RoHC for the VoIP call upon determining that the base station has available RoHC resources, wherein enabling RoHC for the VoIP call comprises performing a handover of the VoIP call from the data radio bearer to a new data radio bearer that has RoHC enabled.

2. A method comprising:
establishing a data radio bearer between a first device and a second device for a Voice-Over Internet Protocol (VoIP) call;
determining that a Signal-to-Interference-plus-Noise Ratio (SINR) parameter for the data radio bearer satisfies a predefined coverage-based condition, wherein the predefined coverage-based condition is a predefined SINR threshold for triggering Transmit Time Interval (TTI) bundling; and
in response to determining that the SINR parameter for the data radio bearer satisfies the predefined coverage-based condition, enabling Robust Header Compression (RoHC) for the VoIP call.

3. The method of claim 2 wherein:
determining that the SINR parameter for the data radio bearer satisfies the predefined coverage-based condition comprises determining that the SINR parameter is less than the predefined SINR threshold for TTI bundling; and
enabling RoHC for the VoIP call comprises enabling both TTI bundling and RoHC for the VoIP call in response to determining that the SINR parameter is less than the predefined SINR threshold for TTI bundling.

4. The method of claim 3 wherein the first device is a base station and the method further comprises:
determining whether the base station has available RoHC resources;
wherein enabling both TTI bundling and RoHC for the VoIP call comprises enabling both TTI bundling and RoHC for the VoIP call if the base station has available RoHC resources.

5. The method of claim 2 wherein enabling both TTI bundling and RoHC for the VoIP call comprises simultaneously enabling both TTI bundling and RoHC for the VoIP call.

6. The method of claim 5 wherein simultaneously enabling both TTI bundling and RoHC for the VoIP call comprises performing an intra-cell handover of the VoIP call from the data radio bearer to a new data radio bearer that has both TTI bundling and RoHC enabled.

7. The method of claim 5 wherein the first device is a base station and the method further comprises:
determining whether the base station has available RoHC resources;

wherein simultaneously enabling both TTI bundling and RoHC for the VoIP call comprises performing an intra-cell handover of the VoIP call from the data radio bearer to a new data radio bearer that has both TTI bundling and RoHC enabled if the base station has available RoHC resources.

8. The method of claim 7 wherein the base station has a finite amount of RoHC resources that are logically divided into a first-come, first-serve RoHC resource pool and a selective RoHC resource pool, and determining whether the base station has available RoHC resources comprises:
determining whether there are available RoHC resources in the first-come, first-serve RoHC resource pool; and
if there are no available resources in the first-come, first-serve RoHC resource pool, determining whether there are available RoHC resources in the selective RoHC resource pool.

9. A base station in a cellular communications network, comprising:
a transceiver subsystem; and
a processing subsystem associated with the transceiver subsystem configured to:
establish, via the transceiver subsystem, a data radio bearer between the base station and a mobile terminal for a Voice-Over Internet Protocol (VoIP) call;
determine that a radio frequency parameter for the data radio bearer satisfies a predefined coverage-based condition;
determine that the base station has available Robust Header Compression (RoHC) resources;
in response to determining that the radio frequency parameter for the data radio bearer satisfies the predefined coverage-based condition, enable RoHC for the VoIP call upon determining that the base station has available RoHC resources, wherein, in order to enable RoHC for the VoIP call, the processing subsystem is further configured to perform a handover of the VoIP call from the data radio bearer to a new data radio bearer that has RoHC enabled.

10. A device comprising:
a transceiver subsystem; and
a processing subsystem associated with the transceiver subsystem configured to:
establish, via the transceiver subsystem, a data radio bearer between the device and a second device for a Voice-Over Internet Protocol (VoIP) call;
determine that a Signal-to-Interference-plus-Noise Ratio (SINR) parameter for the data radio bearer satisfies a predefined coverage-based condition, wherein the predefined coverage-based condition is a predefined SINR threshold for triggering Transmit Time Interval (TTI) bundling; and
in response to determining that the radio frequency parameter for the data radio bearer satisfies the predefined coverage-based condition, enable Robust Header Compression (RoHC) for the VoIP call.

11. The device of claim 10 wherein the processing subsystem is further configured to:
determine that the SINR parameter is less than the predefined SINR threshold for TTI bundling; and
enable both TTI bundling and RoHC for the VoIP call in response to determining that the SINR parameter is less than the predefined SINR threshold for TTI bundling.

12. The device of claim 11 wherein the device is a base station and the processing subsystem is further configured to:
determine whether the base station has available RoHC resources; and
enable both TTI bundling and RoHC for the VoIP call if the base station has available RoHC resources.

13. The device of claim 10 wherein the device is a base station and the processing subsystem is further configured to simultaneously enable both TTI bundling and RoHC for the VoIP call if the base station has available RoHC resources.

14. The device of claim 13 wherein the processing subsystem is further configured to simultaneously enable both TTI bundling and RoHC for the VoIP call via an intra-cell handover of the VoIP call from the data radio bearer to a new data radio bearer that has both TTI bundling and RoHC enabled.

15. The device of claim 13 wherein the processing subsystem is further configured to:
determine whether the base station has available RoHC resources; and
simultaneously enable both TTI bundling and RoHC for the VoIP call via an intra-cell handover of the VoIP call from the data radio bearer to a new data radio bearer that has both TTI bundling and RoHC enabled if the base station has available RoHC resources.

16. The device of claim 15 wherein the processing subsystem comprises a finite amount of RoHC resources that are logically divided into a first-come, first-serve RoHC resource pool and a selective RoHC resource pool, and, in order to determine whether the processing subsystem has available RoHC resources, the processing subsystem is further configured to:
determine whether there are available RoHC resources in the first-come, first-serve RoHC resource pool; and
if there are no available resources in the first-come, first-serve RoHC resource pool, determine whether there are available RoHC resources in the selective RoHC resource pool.

* * * * *